(12) United States Patent
Ohto et al.

(10) Patent No.: US 7,047,021 B2
(45) Date of Patent: May 16, 2006

(54) COMMUNICATION SYSTEM

(75) Inventors: Yasunori Ohto, Tokyo (JP); Yuichi Ueda, Tokyo (JP); Kenji Kameda, Tokyo (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 10/731,864

(22) Filed: Dec. 10, 2003

(65) Prior Publication Data

US 2004/0137917 A1 Jul. 15, 2004

(30) Foreign Application Priority Data

Jan. 9, 2003 (JP) ............................. 2003-003567

(51) Int. Cl.
*H04Q 7/20* (2006.01)

(52) U.S. Cl. .............................. 455/456.1; 455/456.2; 455/456.3; 455/456.4; 455/456.5; 455/456.6

(58) Field of Classification Search ... 455/456.1–456.6
See application file for complete search history.

(56) References Cited

U.S. PATENT DOCUMENTS

| 5,889,770 A | * | 3/1999 | Jokiaho et al. | ............. | 370/337 |
| 6,385,454 B1 | * | 5/2002 | Bahl et al. | .................. | 455/450 |
| 6,397,065 B1 | * | 5/2002 | Huusko et al. | .......... | 455/435.2 |
| 6,459,894 B1 | * | 10/2002 | Phillips et al. | ............. | 455/424 |
| 2002/0085719 A1 | * | 7/2002 | Crosbie | ...................... | 380/248 |

* cited by examiner

*Primary Examiner*—Erika A. Gary
*Assistant Examiner*—Shantell Portis
(74) *Attorney, Agent, or Firm*—Oblon, Spivak, McClelland, Maier & Neustadt, P.C.

(57) ABSTRACT

A communication system adopts communication means having a small effective communication range for communication between mobile terminals and a server functioning as a cell station, so that each server is responsible for a small range only. In this manner, the communication system produces information about how servers are distributed on the network based on the geographic location of each server, thereby pre-delivering the information about such geographic locations and estimating how much and when data is to be delivered based on the positional relationship between servers and mobile terminals for load sharing.

6 Claims, 22 Drawing Sheets

COMMUNICATION SYSTEM

BACKGROUND OF THE INVENTION

1. Field of the Invention

The present invention relates to a communication system which operates under a multi-access environment where a plurality of mobile terminals simultaneously communicate with a single cell station. In particular, the present invention relates to a communication system which can overcome the problem of a cell station becoming overloaded as the number of such mobile terminals increases.

More specifically, the present invention relates to a communication system which can overcome the problem of it becoming more difficult to efficiently layout cell stations in the service area and to successfully carry out routing as cells become smaller. More particularly, the present invention relates to a communication system which allows the network of installed cell stations to be dynamically reconfigured according to their respective locations.

2. Description of the Related Art

Mobile communication dates back to the discovery of electromagnetic waves, and since then, it has been studied and developed as means for communication on boats and ships, aircraft, and trains. Mobile communication is now widespread as means for communication with or among vehicles and persons. Even multimedia content such as computer data and images can be transmitted, in addition to characters and voice by conventional telegraph and telephone.

Recently, mobile terminals are becoming more compact and less expensive because of improved manufacturing engineering. Furthermore, more extensive information and communication services are promoting the personal use of mobile terminals such as cellphones. Deregulation of telecommunication services and reduction in communication charges are also contributing to an increase in the number of mobile users.

Mobile communication is basically achieved such that a mobile station, such as a car phone or a cellphone, transmits/receives radio waves to/from the nearest cell station found. A cell is defined as a communication range within which radio waves from a single cell station are available. A cell is typically formed as a circle with a certain radius and having the cell station antenna at its center. A communication service area is formed of such cells laid out continuously.

FIG. 22 schematically illustrates the layout of cells of a mobile radio communication system, such as a cellular system, in which the service area is covered by using a plurality of cell stations. As shown in FIG. 22, a large service area is formed by continuously laying out cells defined by cell stations (not shown) which are installed at a predetermined distance from each other.

The mobile communication system uses cells, each covering only a range within which radio waves from that cell station are available. This strategy allows the same frequency to be shared among cells, thus efficiently using limited frequency resources. This strategy also allows the output of radio waves for communication to be low, which is advantageous particularly for battery-driven mobile objects because low output of radio waves contributes to power saving and compact design of such mobile objects.

Recently, there has been a growing demand for cells which can accommodate as many users as possible and for efficient use of limited frequency resources, as the number of cellphone (cellular) users increases. One cell handles a plurality of mobile terminals, which simultaneously communicate with a single cell station. For this purpose, the cell station is required to multiplex radio signals to identify which signals belong to which users.

A conventional cell station having terminals connected thereto is a large facility covering a wide service area (cell). Thus, as the number of terminals increases, the same cell station has more terminals connected thereto; that is, the cell station is easily overloaded. The heavy load described above poses a problem in that the data transfer rate becomes low. In order to overcome this problem, smaller cells are usually used; however, smaller cells make it difficult to efficiently layout the cell stations in the service space and successfully carry out routing as the number of cell stations increases.

SUMMARY OF THE INVENTION

Accordingly, an object of the present invention is to provide a superior communication system which can preferably be operated under a multi-access environment where a plurality of mobile terminals simultaneously communicate with a single cell station.

Another object of the present invention is to provide a superior communication system which can overcome the problem of a cell station becoming overloaded as the number of terminals increases.

Another object of the present invention is to provide a superior communication system which can overcome the problem of it becoming more difficult to efficiently layout cell stations in the service space and to successfully carry out routing as cells become smaller.

Another object of the present invention is to provide a superior communication system which allows the network of installed cell stations to be dynamically reconfigured according to their respective locations.

According to an aspect of the present invention, a data communication system includes mobile terminals; connection servers, each including acquiring means for acquiring location information concerning the location of the connection server and having a cell; and control servers, each including updating means for updating network information based on the location information. In the communication system, each of the connection servers connects to some of the mobile terminals to transfer data between the mobile terminals via the connection servers or the control servers.

It is noted that the term "system" used herein refers to a logical set of apparatuses (or functional modules which carry out their specific functions), irrespective of whether the apparatuses or functional modules are included in a single casing.

The communication system uses connection servers as cell stations, each responsible for a small effective range, and thereby produces information about neighboring connection servers based on the geographic location of each connection server, irrespective of the physical connections of the network. By using this information about the neighboring connection servers, the communication system carries out estimation-based data delivery and caching for load sharing.

The communication system adopts communication means having a small effective communication range for communication between mobile terminals and a cell station. In more detail, the communication system includes connection servers functioning as cell stations, each of which is responsible for a small range only. In this manner, the communication system produces information about how connection servers are distributed on the network based on the geographic location of each connection server, thereby pre-delivering the information about such geographic locations and estimating how much and when data is to be delivered based on the positional relationship between connection servers and mobile terminals for load sharing.

The updating means may update connections among a connection server and neighboring connection servers based on the cell states of the neighboring connection servers.

The communication system may allow a new connection server to be installed. Such a new movable connection server may be installed, for example, in a relatively large exhibition area where exhibitor booths are laid out adjacent to each other.

The updating means may select a connection server neighboring to the new server, identify at least one cell affected by the new server, and change connections among the connection server and neighboring connection servers depending on the distances among the connection server and the neighboring connection servers.

In the communication system, each connection server may further include content-transmission managing means for switching a connection server being communicating with a mobile terminal to another connection server with which the mobile terminal will communicate, as the mobile terminal moves from one cell to another.

In the communication system, each control server may further include load-sharing means for monitoring the processing capability of each connection server and for controlling load sharing depending on the geographic location of each connection server. The load-sharing means may control load sharing based on estimated movements of the mobile terminals.

As described above, the present invention provides a superior communication system which can overcome the problem of a cell station becoming overloaded as the number of mobile terminals increases and allows the network of installed cell stations to be dynamically reconfigured according to their respective locations.

Other features and advantages of the present invention will become apparent as the following description proceeds upon reference to the attached drawings.

DESCRIPTION OF THE PREFERRED EMBODIMENTS

Embodiments of the present invention will now be described with reference to the drawings.

A communication system according to the present invention adopts communication means having a small effective communication range for communication between mobile terminals and a cell station. In more detail, the communication system includes servers functioning as cell stations, each of which is responsible for a small range only. In this manner, the communication system produces information about how servers are distributed on the network based on the geographic location of each server, thereby pre-delivering the information about such geographic locations and estimating how much and when data is to be delivered based on the positional relationship between servers and mobile terminals. The communication system according to the present invention is thus intended to spread a heavy load on cell stations.

In short, the communication system uses servers as cell stations, each responsible for a small effective range, and thereby produces information about neighboring servers based on the geographic location of each server, irrespective of the physical connections of the network. By using this information about the neighboring servers, the communication system carries out estimation-based data delivery and caching for load sharing.

Figure 1:
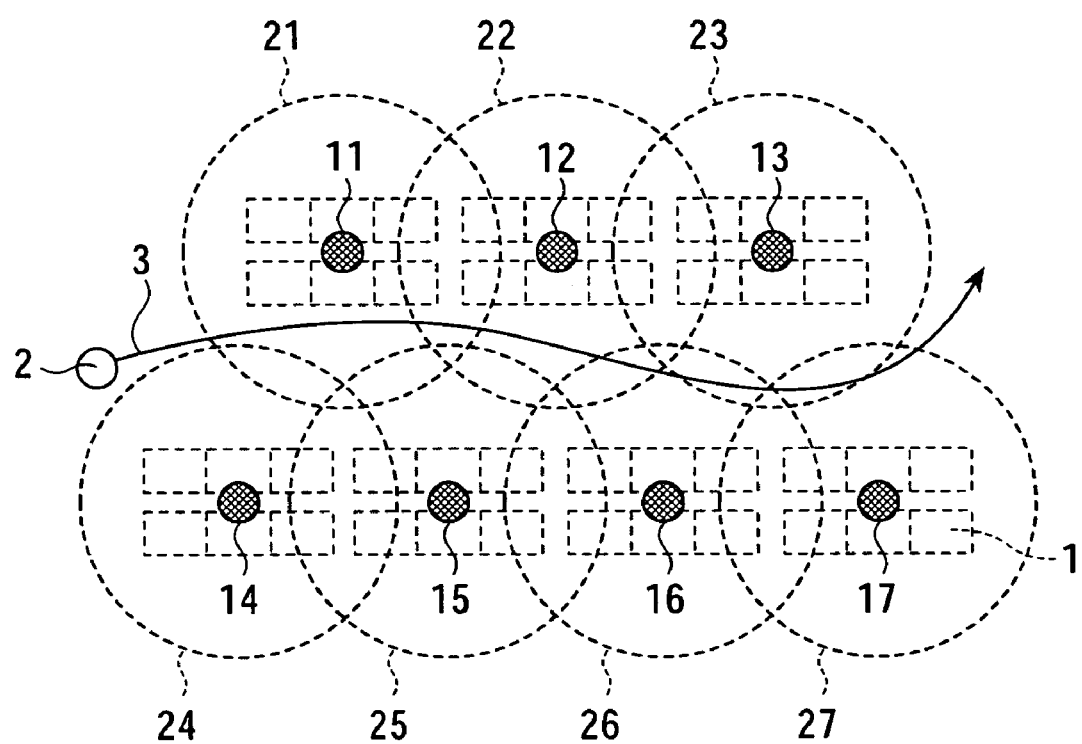
FIG. 1 schematically illustrates how a portable terminal switches from one connection server to another as the portable terminal moves through the respective effective ranges.

FIG. 1 schematically illustrates how a portable terminal 2 switches from one connection server 11, 12, 13, 14, 15, 16, or 17 to another as the user of the portable terminal 2 moves through effective ranges 21 to 27 along a route 3 in the communication system according to the present invention. In FIG. 1, the movable connection servers 11 to 17 are installed, for example, in a relatively large exhibition area where exhibitor booths 1 are laid out adjacent to each other, a few booths forming one block. Bluetooth is an example of a radio communication system which allows wireless communication within such a small range.

In the example of FIG. 1, the communication areas 21 to 27 are continuously laid out; however, an area where the portable terminal 2 cannot connect to any connection server may exist.

In FIG. 1, when the user of the portable terminal 2 enters a communication area, the portable terminal 2 can connect to the corresponding connection server. In the example of FIG. 1, the portable terminal 2 first enters the area 21 to communicate with the connection server 11. The portable terminal 2 then moves into the area 22 to communicate with at least one of the connection servers 11 and 12. In this manner, the portable terminal 2 switches from one connection server to another as the user of the terminal 2 moves along the route 3.

Figure 2:
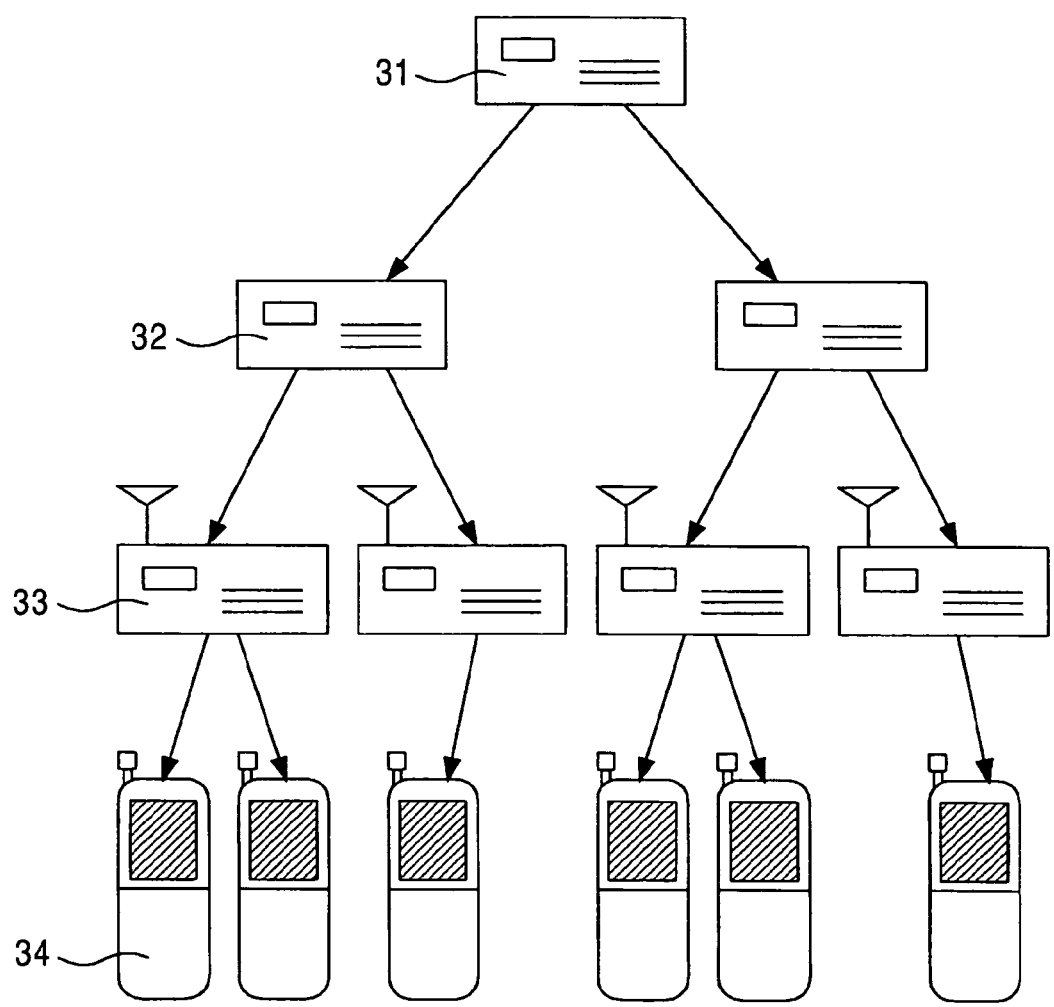
FIG. 2 schematically illustrates a hierarchical network configuration of a communication system according to an embodiment of the present invention.

FIG. 2 schematically illustrates a hierarchical network configuration of the communication system according to the embodiment. Portable terminals 34 each perform radio communication with a connection server 33 covering its respective area. The connection servers 33 can transfer data to each other by way of routing (or control) servers 31 and 32 having the capability of routing from one connection server to another. These routing servers 31 and 32 are arranged hierarchically according to the size of the network. The routing servers 31 and 32 and the connection servers 33 are interconnected via a backbone network.

Figure 3:
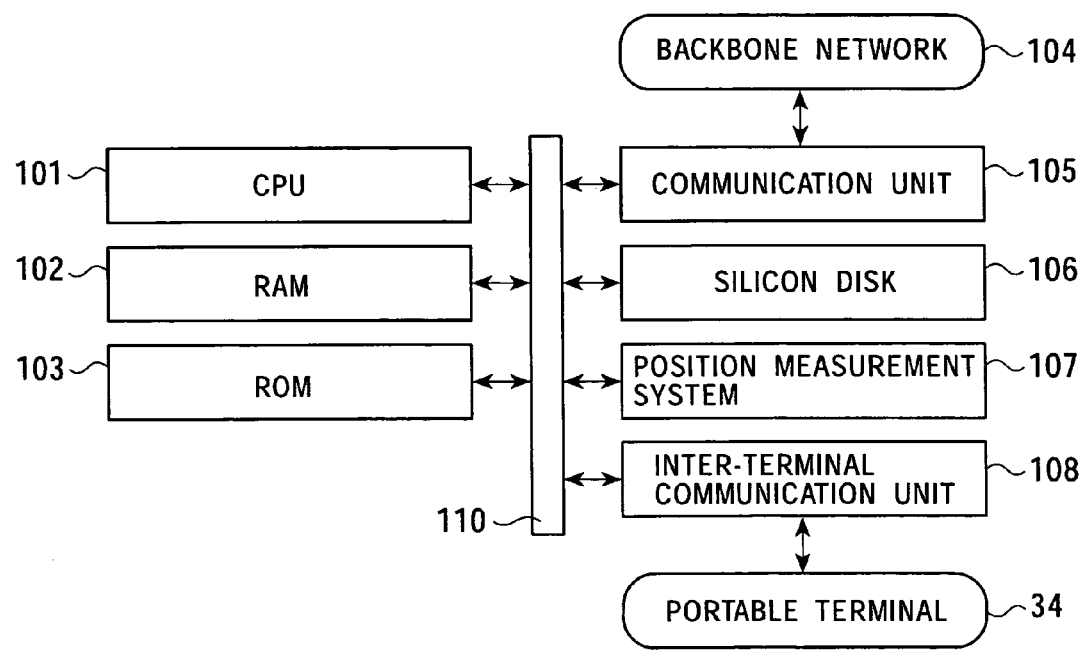
FIG. 3 schematically illustrates a functional configuration of a connection server connected to portable terminal.

FIG. 3 schematically illustrates a functional configuration of each of the connection servers 33 (as shown in FIG. 2) connected to the portable terminals 34.

A central processing unit (CPU) 101, functioning as the main controller, executes various applications under the control of an operating system (OS). In this embodiment, the CPU 101 is capable of executing server applications which are responsible for connection to the portable terminals 34 within its coverage area, data transfer between such portable terminals 34, routing via higher-level servers, and other functions. As shown in FIG. 3, the CPU 101 is interconnected with other units and devices (described later) via a bus 110.

A main memory (RAM) 102 is a storage device which stores loaded program code executed by the CPU 101 and temporary work data used by such an execution program. The main memory 102 may be composed of a semiconductor memory such as a dynamic RAM (DRAM). More specifically, the main memory 102 stores execution programs such as server applications which are responsible for connection to the portable terminals 34 within its coverage area, data transfer between such portable terminals 34, routing via higher-level servers, and other functions. The main memory 102 also stores temporary data such as the server status and the current network configuration.

A read only memory (ROM) 103 is a semiconductor memory device for permanently storing data such as data for a power on self test (POST) executed at power ON and hardware input/output program code called a basic input/output system (BIOS). The ROM 103 also stores the procedures for communication with the portable terminals 34 in its area and for communication between servers via a backbone network 104.

A communication unit 105 carries out communication via the backbone network 104 according to a predetermined communication protocol.

A silicon disk 106 is a large-capacity storage device for high-speed saving and reading of content.

A position measurement system 107 measures the locations of the connection servers 33 (as shown in FIG. 2) by using an existing positioning system such as the global positioning system (GPS) or local positioning system (LPS).

An inter-terminal communication unit 108 connects to a portable terminal found in its area and carries out subsequent data communication with the portable terminal.

Figure 4:
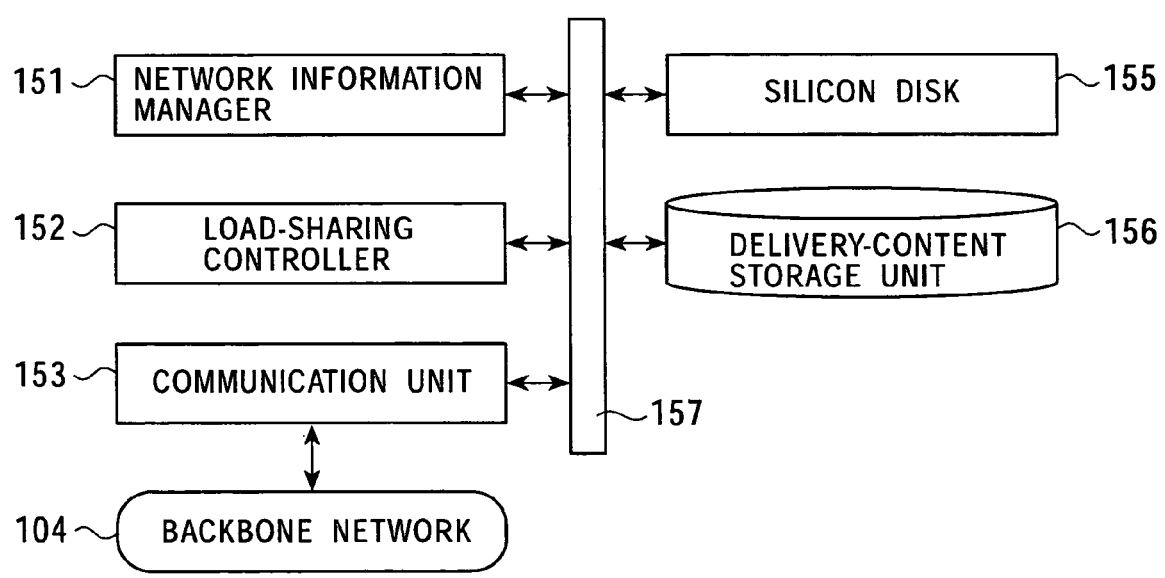
FIG. 4 schematically illustrates a functional configuration of a control server responsible for routing between the connection servers shown in FIG. 3 and for other control over the connection servers.

FIG. 4 schematically illustrates a functional configuration of each of the routing (or control) servers 31 and 32 (shown in FIG. 3) responsible for routing between the connection servers 33 and for other control over the connection servers 33.

The control servers 31 and 32 shown in FIG. 4 are interconnected by way of the backbone network 104 and are responsible for network reconfiguration and routing between the connection servers 33.

A network information manager 151 manages network information concerning the geography of the connection servers 33 distributed under the communication system environment.

A load-sharing controller 152 monitors the processing capacity of each connection server 33 to control how the load should be shared according to the geographic locations of the connection servers 33.

A communication unit 153 carries out communication via the backbone network 104 according to a predetermined communication protocol.

A silicon disk 155 is a large-capacity storage device for high-speed saving and reading of content. A delivery-content storage unit 156 is a huge auxiliary storage device which stores content to be delivered to the portable terminals 34 (as shown in FIGS. 2 and 3).

Figure 5:
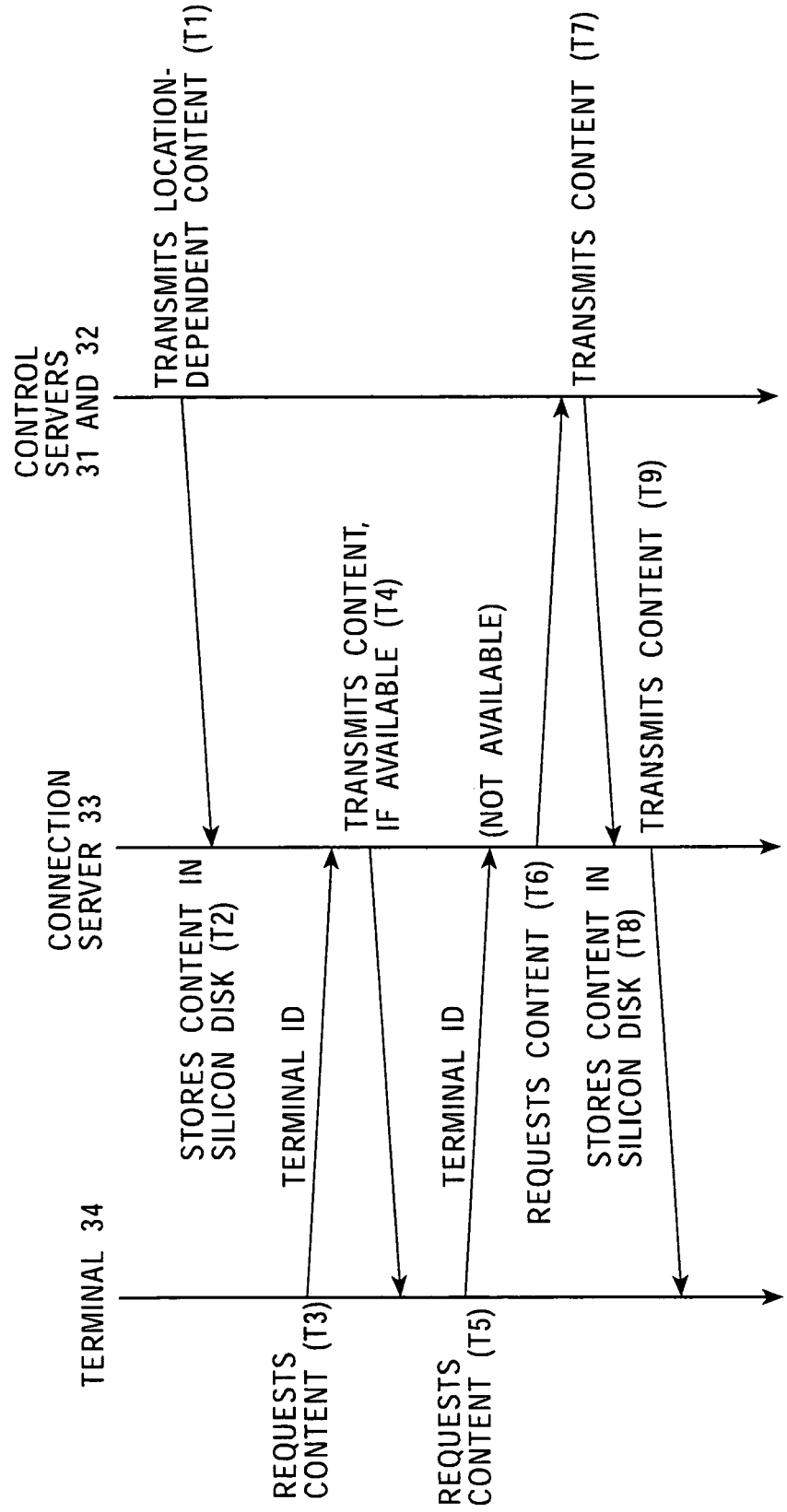
FIG. 5 is an operating sequence chart for transmission of content.

FIG. 5 is an operating sequence chart for transmission of content in the communication system according to this embodiment. The example in FIG. 5 assumes that a portable terminal 34 requesting content does not move.

First, content according to the location of the connection server 33 is transmitted from the higher-level control servers 31 and 32 to the connection server 33 (T1).

When receiving the content, the connection server 33 temporarily stores the content in the silicon disk 106 (T2).

When receiving a request for content from the portable terminal 34 (T3), the connection server 33 transmits the content to the requesting terminal 34 if the requested content exists in the silicon disk 106 (T4). In this process, the portable terminal 34 may be authenticated using information such as a terminal ID.

On the other hand, in response to the request for the content from the portable terminal 34 (T5), the connection server 33 makes a request for the content to the control servers 31 and 32 (T6) if the content does not exist in the silicon disk 106.

In response to the request for the content, the control servers 31 and 32 fetch the content from the delivery-content storage unit 156 and send it to the requesting connection server 33 (T7). When receiving the content, the connection server 33 temporarily stores the content in the silicon disk 106 (T8).

In this process, free space for the content may be secured in the silicon disk 106, which has a limited storage capacity, before the content is stored therein. To this end, the content items may be given respective assessment scores based on the appropriately weighted latest access time, access frequency, and number of access users, and then may be deleted in ascending order of the assessment scores until free space for the target content is secured.

Thereafter, the connection server 33 transmits the content to the requesting terminal 34 (T9).

Figure 6:
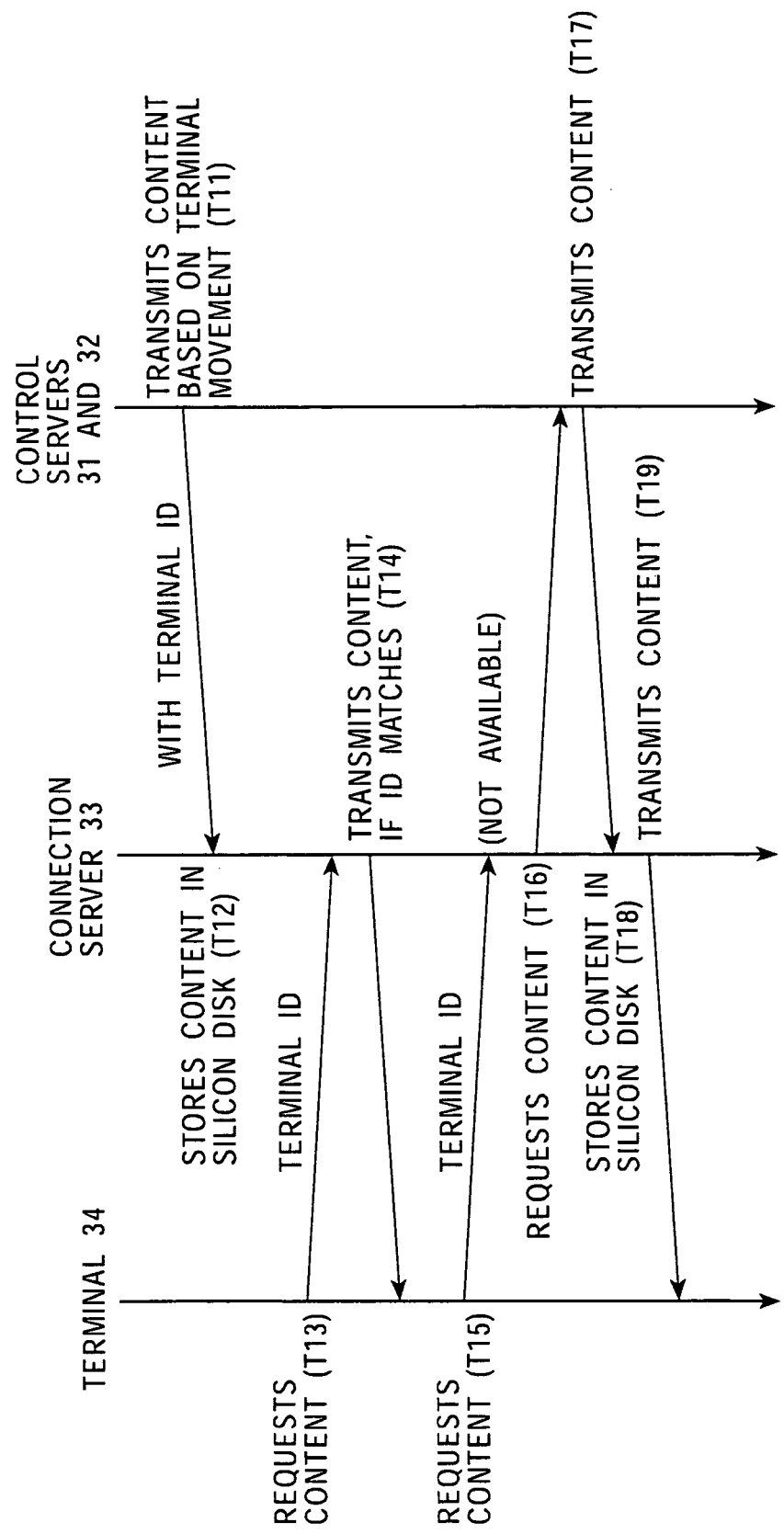
FIG. 6 is an operating sequence chart for transmission of content in the case where the portable terminal requesting the content is moving.

FIG. 6 is an operating sequence chart for transmission of content, assuming that the portable terminal 34 requesting the content is moving.

First, the control servers 31 and 32 deliver content to a connection server 33 to which the portable terminal 34 is likely to connect in future (T11). For this purpose, the prospective connection server 33 is predicted based on the log of geographic location of the portable terminal 34 communicating with the current connection server 33.

When receiving the content delivered, the prospective connection server 33 temporarily stores it in the silicon disk 106 (T12). Thereafter, when receiving a request for the content from the portable terminal 34 (T13), the connection server 33 transmits the content to the requesting terminal 34 (T14). In this process, the portable terminal 34 may be identified as the expected portable terminal using information such as a terminal ID.

On the other hand, if the content requested by the portable terminal 34 is different from the expected content (T15), the connection server 33 makes a request for the content to the control servers 31 and 32 (T16).

In response to the request for the content, the control servers 31 and 32 fetch the content from the delivery-content storage unit 156 and send it to the requesting connection server 33 (T17). When receiving the content, the connection server 33 temporarily stores it in the silicon disk 106 (T18).

In this process, free space for the content may be secured in the silicon disk 106, which has a limited storage capacity, before the content is stored therein. To this end, the content items may be given respective assessment scores based on the appropriately weighted latest access time, access frequency, and number of access users, and then may be deleted in ascending order of the assessment scores until free space for the target content is secured.

Thereafter, the connection server 33 transmits the content to the requesting terminal 34 (T19).

Figure 7:
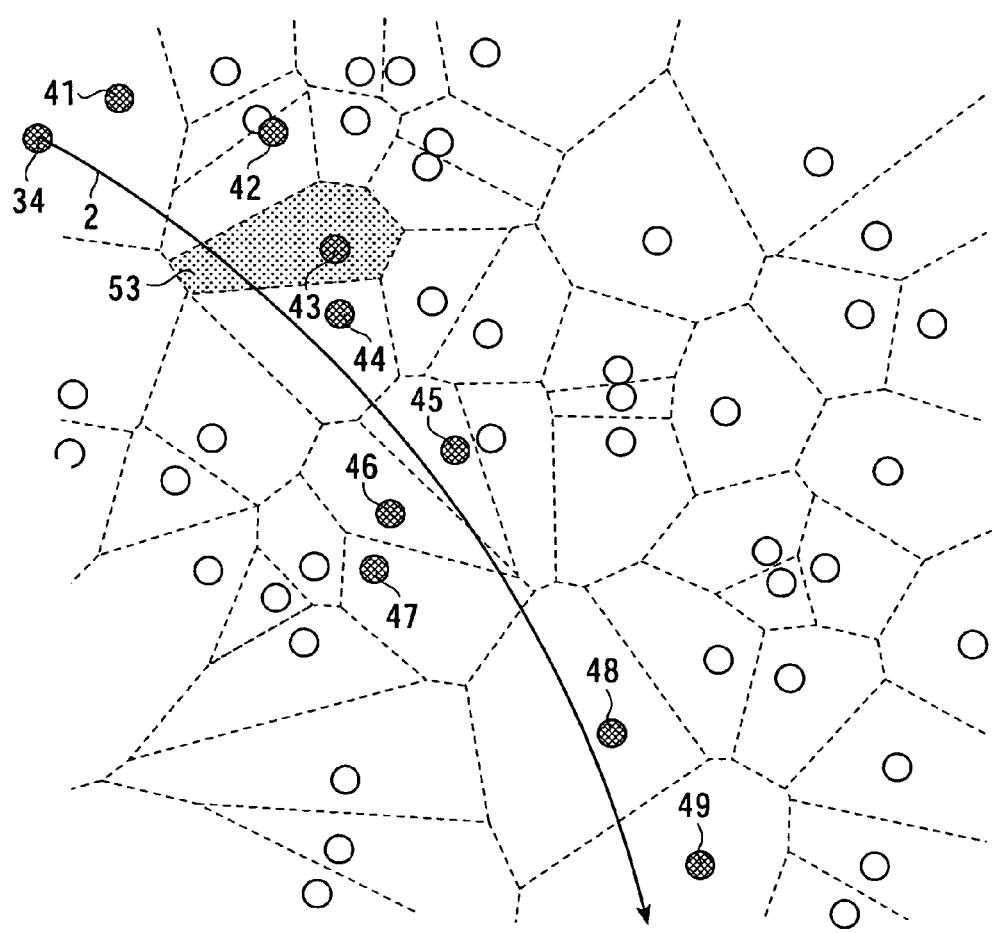
FIG. 7 is a Voronoi diagram showing the spatial layout of connection servers.

FIG. 7 is a Voronoi diagram showing the spatial layout of the connection servers 33 (shown in FIG. 2). The Voronoi diagram is defined as a diagram formed by partitioning a plane into polygons such that each polygon contains exactly one point and every location in a given polygon is closer to that point than to any other. Each of such points is referred to as a sampling point, a polygon as a Voronoi region, and a boundary between Voronoi regions as a Voronoi boundary. An intersection of Voronoi boundaries is referred as a Voronoi point.

FIG. 7 assumes that the user of the portable terminal 34 moves along a route 2 in a communication environment including connection servers 41 to 49.

In the example of FIG. 1, when the portable terminal 2 enters the communication ranges of more than one of the connection servers 11 to 17, the portable terminal 2 communicates with at least one of the connection servers 11 to 17; in the example of FIG. 7, however, the portable terminal 34 basically communicates with a single connection server at a time.

The connection servers 41 to 49 acquire the information about their respective geographic locations by using the position measurement system 107 (as shown in FIG. 3). The connection servers 41 to 49 each send the location information to the control servers 31 and 32 via the backbone network 104. The control servers 31 and 32 manage, in the network information manager 151 (as shown in FIG. 4), the network information concerning the geography of the connection servers 41 to 49 to form a Voronoi diagram covering the subordinate connection servers each representing a vertex of the corresponding cell.

When the user of the portable terminal 34 moves along the route 2, the portable terminal 34 switches the target connection server for communication, starting from the server 41 and proceeding to the servers 42, 43, 44, 45, 46, 47, 48, and finally 49, as soon as the user enters the respective cells. In the switching described above, a technique such as handoff, where the portable terminal 34 simultaneously communicates with two connection servers at the boundary of the corresponding cells, is required for smooth switching from one server to another.

Figure 8:
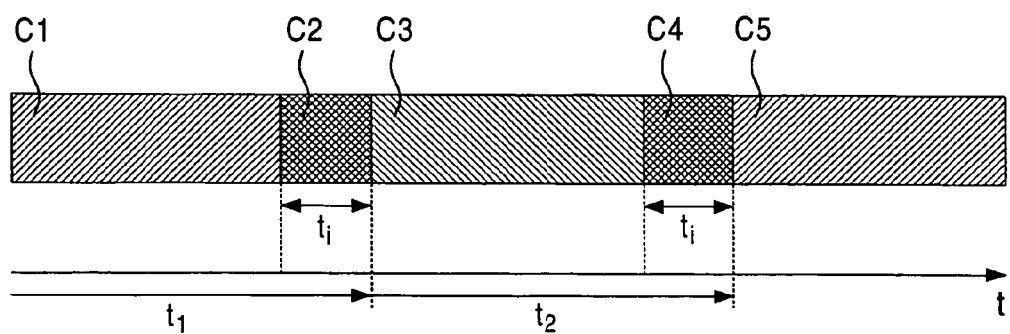
FIG. 8 illustrates how streaming content is partially transferred based on an estimated movement of the user of a portable terminal.

FIG. 8 illustrates how and when streaming content is partially transferred based on an estimated movement of the user.

When the portable terminal 34 is located in a cell 53 shown in FIG. 7, the part of the streaming data corresponding to t1 at which the user of the portable terminal 34 will pass through the cell 53 (i.e., segments C1 and C2) is transferred to the connection server 43, which is the vertex of the cell 53.

The segments C3 and C4 along with the overlapping segment C2 are then transferred to the next prospective connection server 44. In the same manner, the segment C5 along with the overlapping segment C4 is transferred to the next prospective connection server 45.

Figure 9:
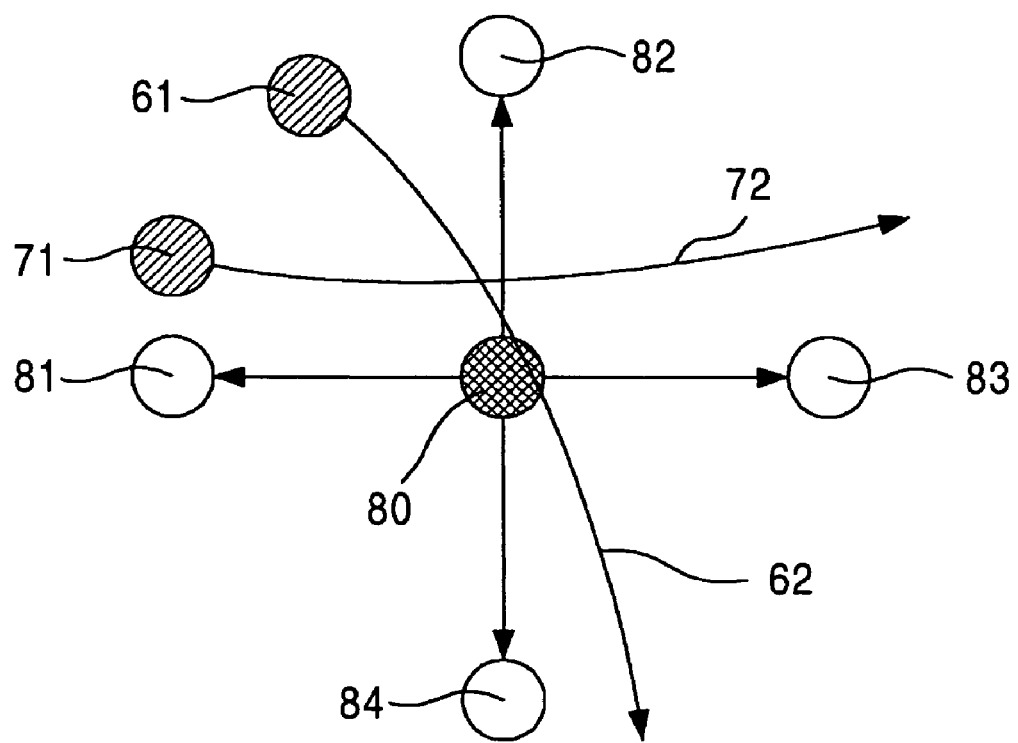
FIG. 9 illustrates how a connection server shares its load with other neighboring servers.

FIG. 9 illustrates how a connection server 80 shares its load with other neighboring servers 81 to 84. FIG. 9 assumes that the users of portable terminals 61 and 71 move along routes 62 and 72, respectively.

While the portable terminals 61 and 71 are connected with the connection server 80, the connection server 80 may spend some time on other processing, and may bear a higher load than the neighboring servers 81 to 84. In such a case, the load on the connection server 80 may be spread so that the load factor is equal across the connection servers 80 to 84. The language "the load factor is equal" used herein means that the connection servers 80 to 84 would take the same time to complete processing depending on their respective computing capabilities.

Load sharing is carried out based on how the users are likely to behave. In FIG. 9, the connection server 84 is about to handle future request from the user of the portable terminal 61.

On the other hand, the user of the portable terminal 71 is likely to connect to the server 83, and therefore the connection server 83 is going to handle the request from the user of the portable terminal 71 for load sharing.

Figure 10:
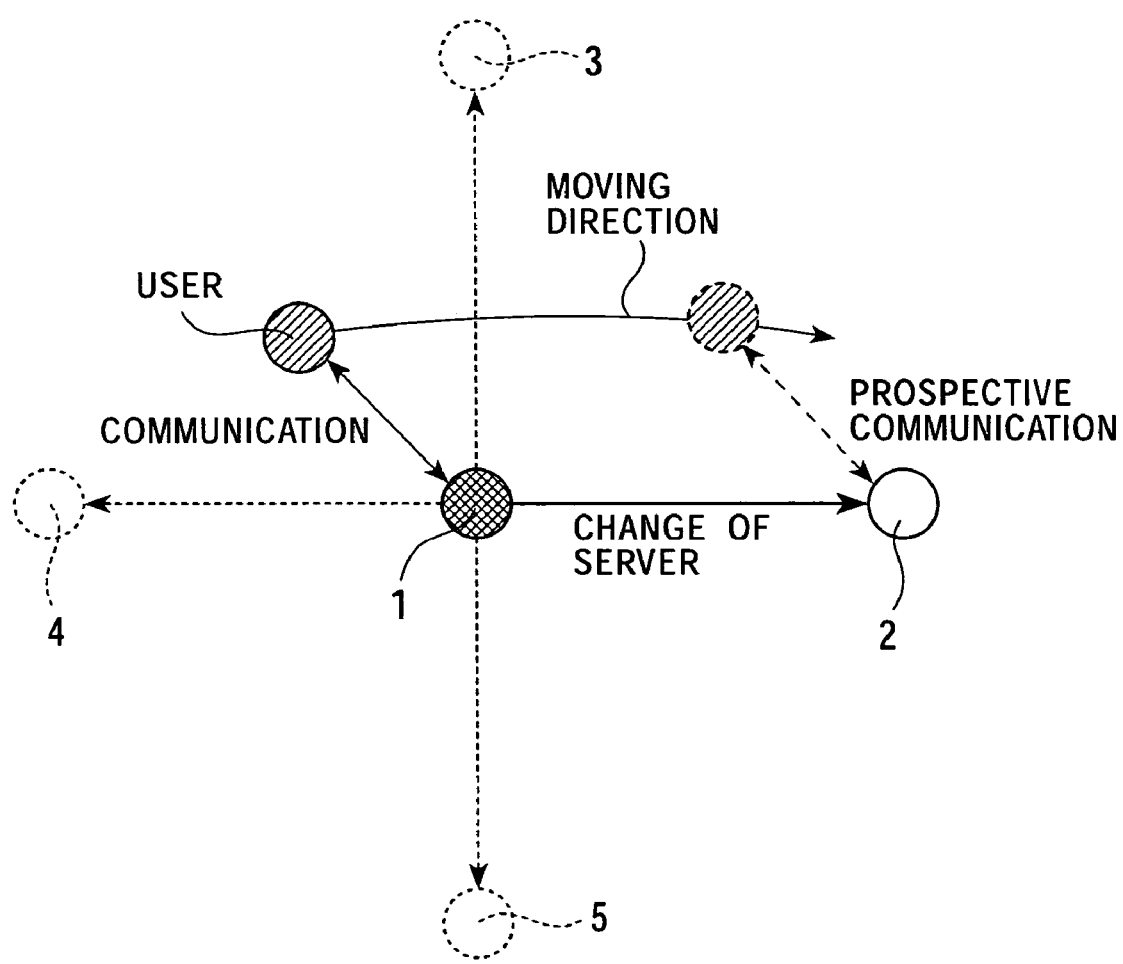
FIG. 10 shows how a portable terminal switches from one connection server to another as the user of the portable terminal moves.

FIG. 10 shows how a portable terminal switches from one connection server to another as the user of the portable terminal moves.

The communication environment shown in FIG. 10 includes the connection server 1 and its neighboring connection servers 2 to 5. A user's portable terminal is connected to the connection server 1; as the user moves in the direction indicated by the arrow shown, the portable terminal is expected to connect to the connection server 2.

Figure 11:
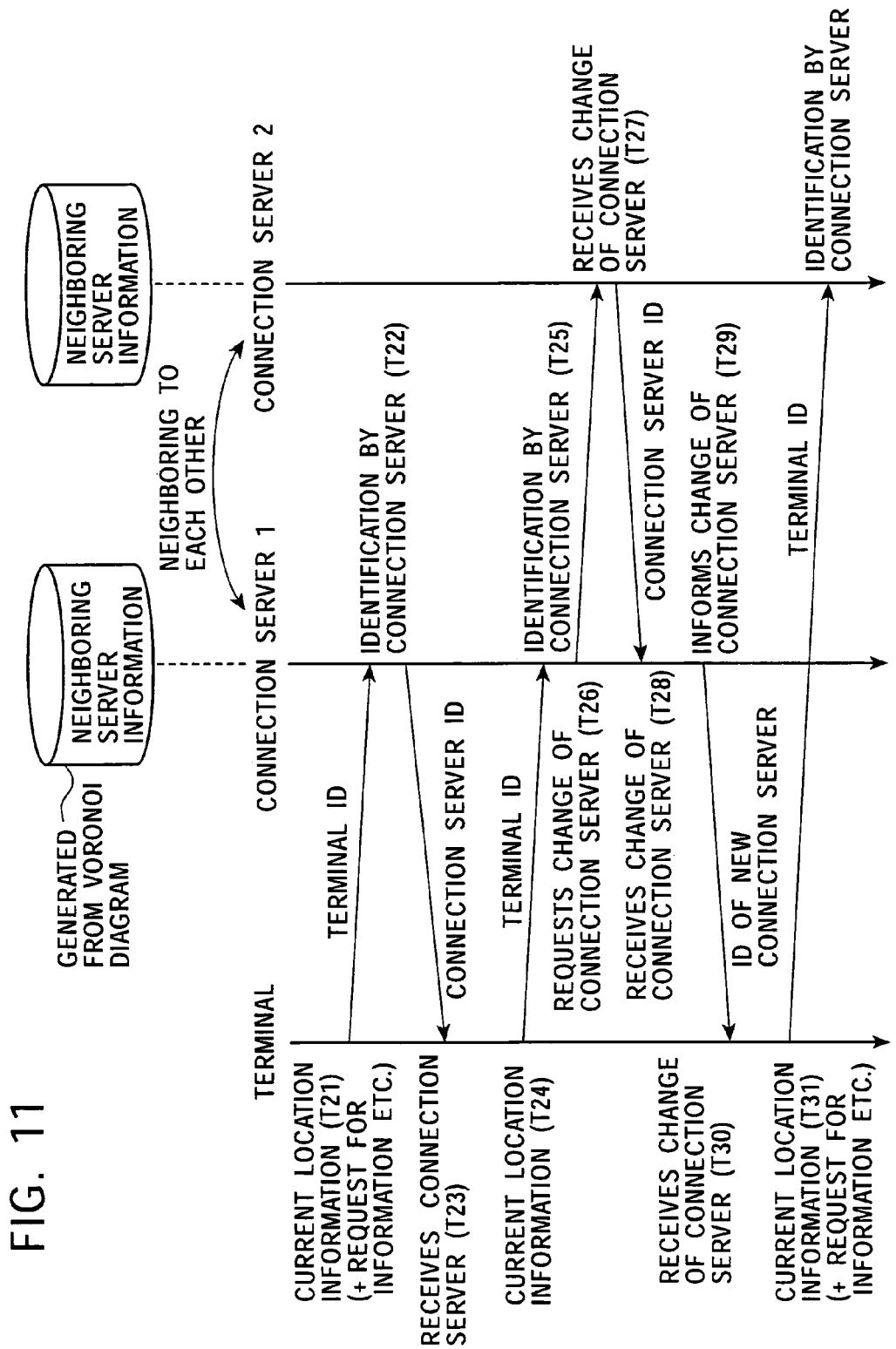
FIG. 11 shows a sequence of operations among the portable terminal, the current connection server, and the prospective connection server under the situation where the portable terminal moves as shown in FIG. 10.

FIG. 11 shows a sequence of operations among the portable terminal, the current connection server 1, and the prospective connection server 2 under the situation where the portable terminal moves as shown in FIG. 10. In FIG. 11, it is assumed that the connection servers 1 and 2 form a Voronoi diagram representing the network configuration, thereby acquiring the information about the neighboring servers and the prospective server with which the portable terminal is expected to communicate.

The portable terminal on the move transmits the information about its current location and, if necessary, a request for content and other information to the currently connected connection server 1, along with its terminal ID (T21).

The connection server 1 identifies the portable terminal (T22) based on the received terminal ID and returns a response message including its connection server ID to the portable terminal. The portable terminal receives this response message (T23).

Subsequently, the above-described procedure where the portable terminal transmits the information about its current location to the connection server 1 (T24) and the connection server 1 identifies the portable terminal (T25) is repeated.

When the portable terminal is to change from the connection server 1 to another as the user moves along his/her route, the current connection server 1 transmits a request for a change of the connection server to the neighboring connection server 2 with which the portable terminal is expected to communicate (T26).

When receiving the request for a change of the connection server (T27), the neighboring connection server 2 returns a response message including its connection server ID.

When receiving this response message (T28), the requesting connection server 1 transmits a notice regarding a change of the connection, including the server ID of the prospective connection server 2, to the portable terminal (T29). The portable terminal receives this response message (T30).

Thereafter, the portable terminal transmits the information about its current location and, if necessary, a request for content and other information for the prospective connection server 2 to the currently connected connection server 1, along with its terminal ID (T31).

Figure 12:
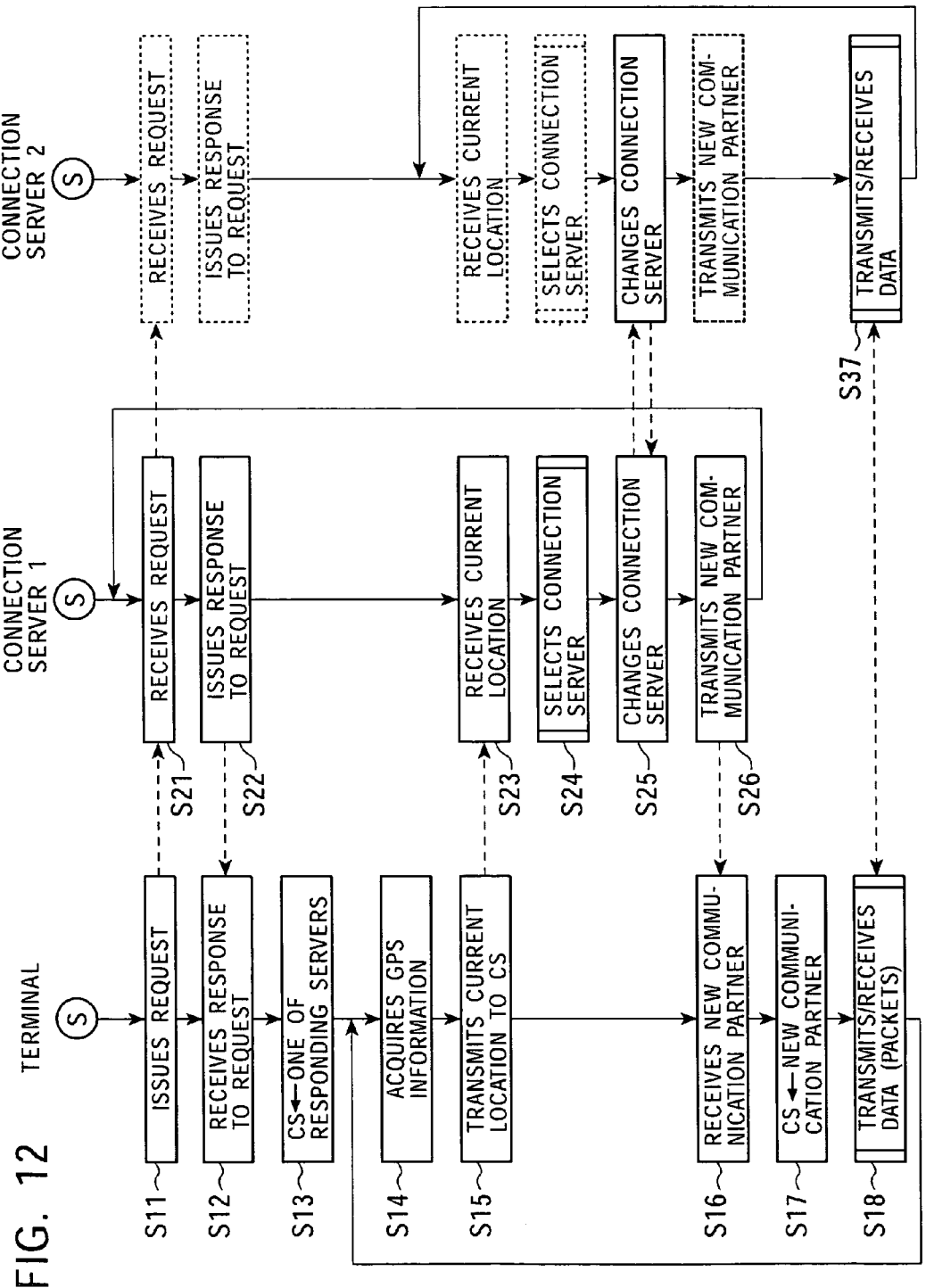
FIG. 12 is a flowchart showing a sequence of operations when the portable terminal shown in FIG. 10 switches from the current connection server to a prospective connection server.

FIG. 12 is a flowchart showing a sequence of operations when the portable terminal switches from the current connection server 1 to the prospective connection server 2, as shown in FIG. 10. In FIG. 12, it is assumed that the connection servers 1 and 2 form a Voronoi diagram representing the network configuration, thereby acquiring the information about the neighboring servers and the prospective server with which the portable terminal is expected to communicate.

The portable terminal issues a request for content (step S11). When receiving this request (step S21), neighboring connection servers including the connection server 1 issue a response to the request (step S22).

When receiving the response to the request from the neighboring servers (step S12), the portable terminal registers one of the connection servers that have responded (connection server 1 in this example) as the cell station (CS) to which the portable terminal is to connect (step S13).

In addition, the portable terminal acquires the GPS information from a position measurement system (step S14) and sends the GPS information to the currently connected connection server 1 (step S15).

When receiving the information about the current location from the portable terminal (step S23), the connection server 1 selects a connection server according to the expected movement route of the portable terminal (step S24). When the portable terminal is to change from the connection server 1 to another as the portable terminal moves, the current connection server 1 transmits a request for a change of the connection server to the neighboring connection server 2 with which the portable terminal is expected to communicate (step S25). The connection server 1 informs the portable terminal of the server 2 with which the portable terminal is to communicate (step S26).

When receiving this information about the prospective connection server 2 (step S16), the portable terminal registers the connection server 2 as a new cell station (step S17). Subsequently, the portable terminal transmits/receives data to/from the connection server 2 which is the newly connected server (steps S18 and S37).

As described above, according to the communication system of this embodiment, the spatial layout of the connection servers is managed by using a Voronoi diagram. In an area where communication load is locally intensive, such as an exhibition area, extra (or new) connection servers may be installed and these additional connection servers cause the hierarchic network configuration to be dynamically reconfigured based on the Voronoi diagram.

Figure 13:
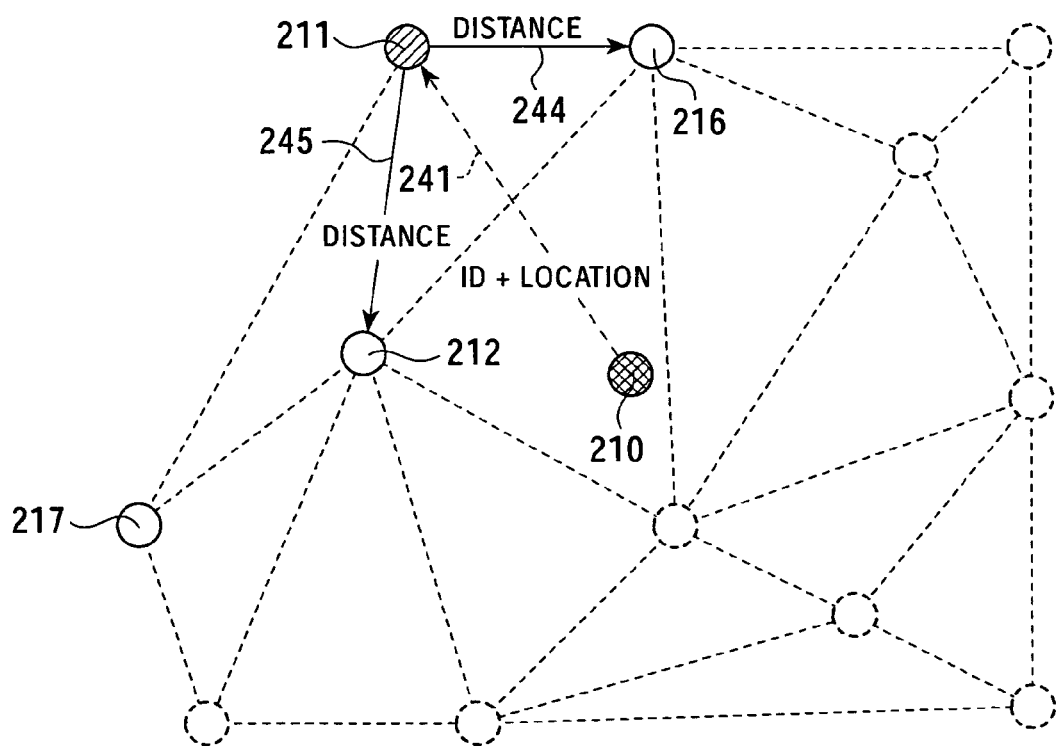
FIG. 13 illustrates how a new cell is determined when a new server is installed in a communication system.
Figure 14:
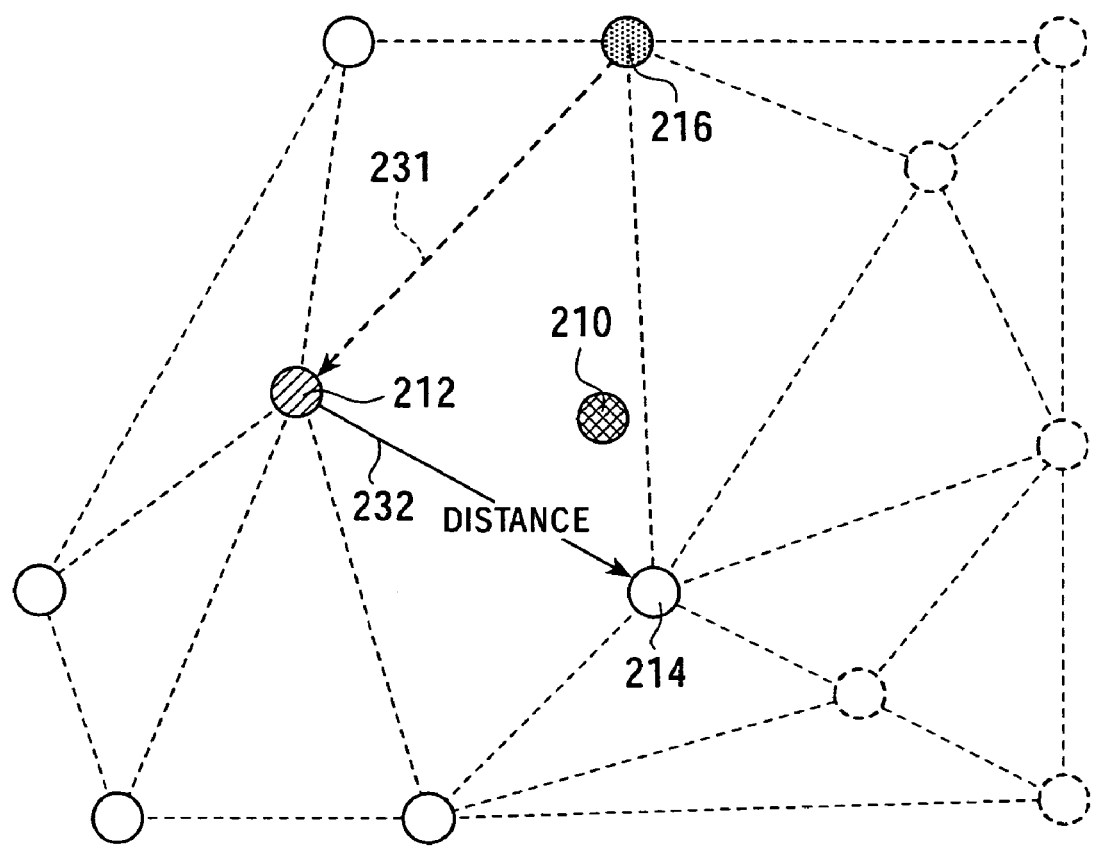
FIG. 14 illustrates how a new cell is determined when a new server is installed in a communication system.
Figure 15:
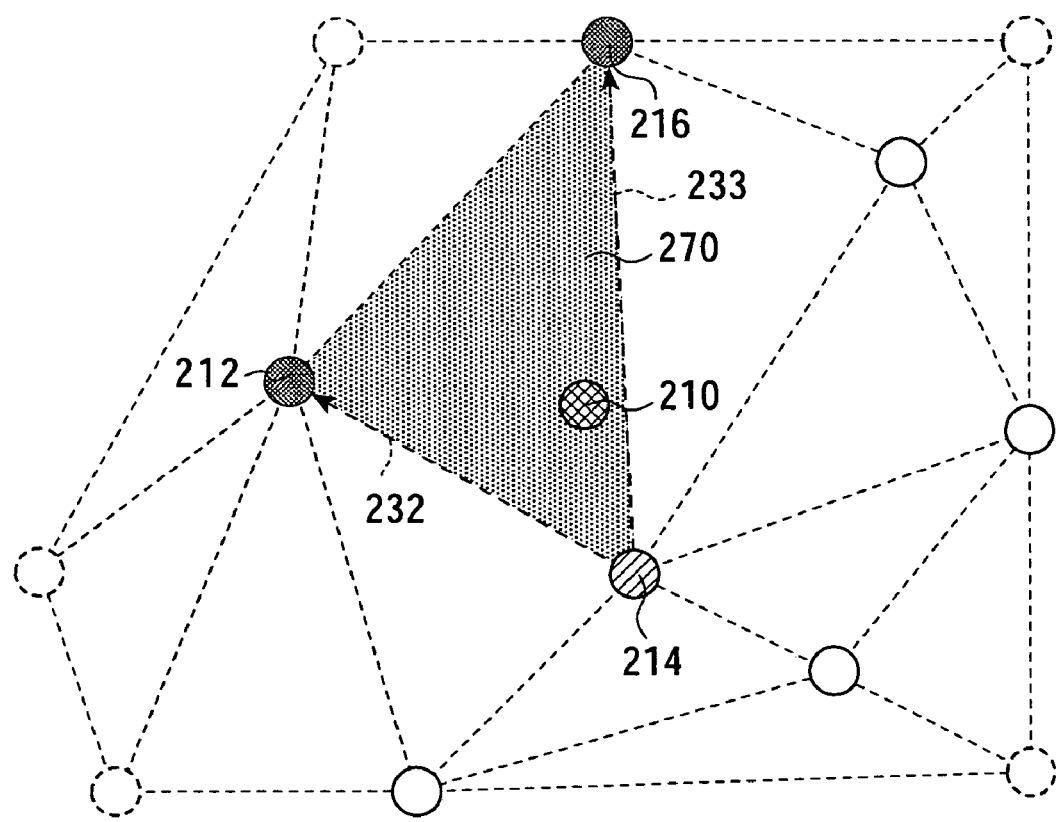
FIG. 15 illustrates how a new cell is determined when a new server is installed in a communication system.

FIGS. 13 to 15 illustrate, step by step, how a new cell is determined when a new server 210 is installed in the communication system.

First, it is assumed that the connection servers each have a unique ID in the network configuration. It is also assumed that, on the network, each connection server has a list of neighboring servers directly connected thereto with a link, thus storing the information about the server IDs and the locations of the directly connected servers.

A new server 210 broadcasts a network entry request (an ID and position coordinates, which are acquired using the GPS installed therein). A connection server which receives this request may not be included in a target cell 270 (as shown in FIG. 15).

Referring to FIG. 13, a connection server 211 receives the request issued by the new server 210. The connection server 211 calculates the direction toward the new server 210 and selects connection servers which are to be informed of the above-described request based on the calculated direction vector. In more detail, the connection server 211 first finds such connection servers having directions causing a positive inner product with respect to the calculated direction vector (servers 212, 216, and 217 in this example) and, from among the found connection servers, selects the servers which have the smallest angle to the left and the right, respectively (servers 216 and 212 in this example). Thus, the connection server 211 informs the servers 212 and 216 of the above-described request, as indicated by reference numerals 244 and 245.

FIG. 14 shows how each of the connection servers 212 and 216 informed of the request sends data to the next server. When the connection server 216 sends information to the connection server 212 (as indicated by reference numeral 231), the connection server 212 returns a message that it has the same information as the connection server 216 because the connection server 212 has received the same information via another route (as indicated by reference numeral 245 in FIG. 13). The connection server 216 which has received this return message does not carry out the next data transfer.

Furthermore, because the message indicated by reference numeral 231 has been sent, the connection server 212 does not send a message in this direction. Instead, the message is sent to a connection server 214 via the other connection path 232.

Similarly, in FIG. 15, the connection server 214 transfers messages 232 and 233 to the neighboring connection servers 212 and 216, respectively, and both servers 212 and 216 return a message indicating that they have received the same messages to the server 214. Thereby, the relevant connection server 214 is recognized to reside at an end of the cell 270 including the new connection server 210.

Figure 16:
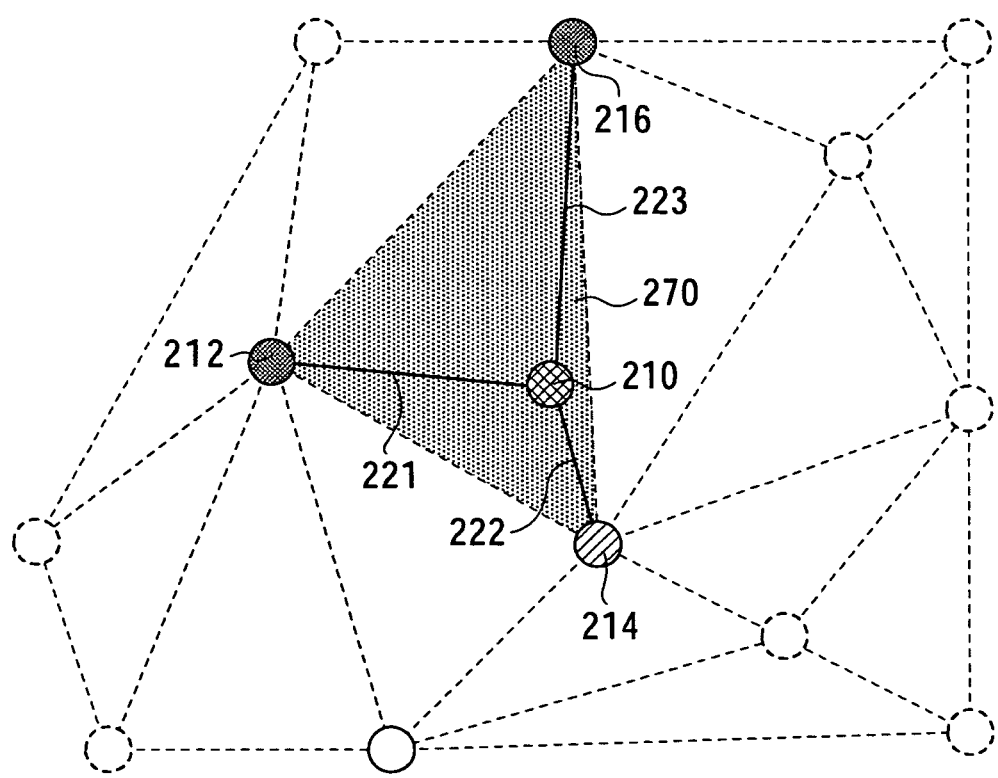
FIG. 16 shows how a network is reconfigured, i.e., how the connections among connection servers are changed, as a result of a new server entering the network.
Figure 17:
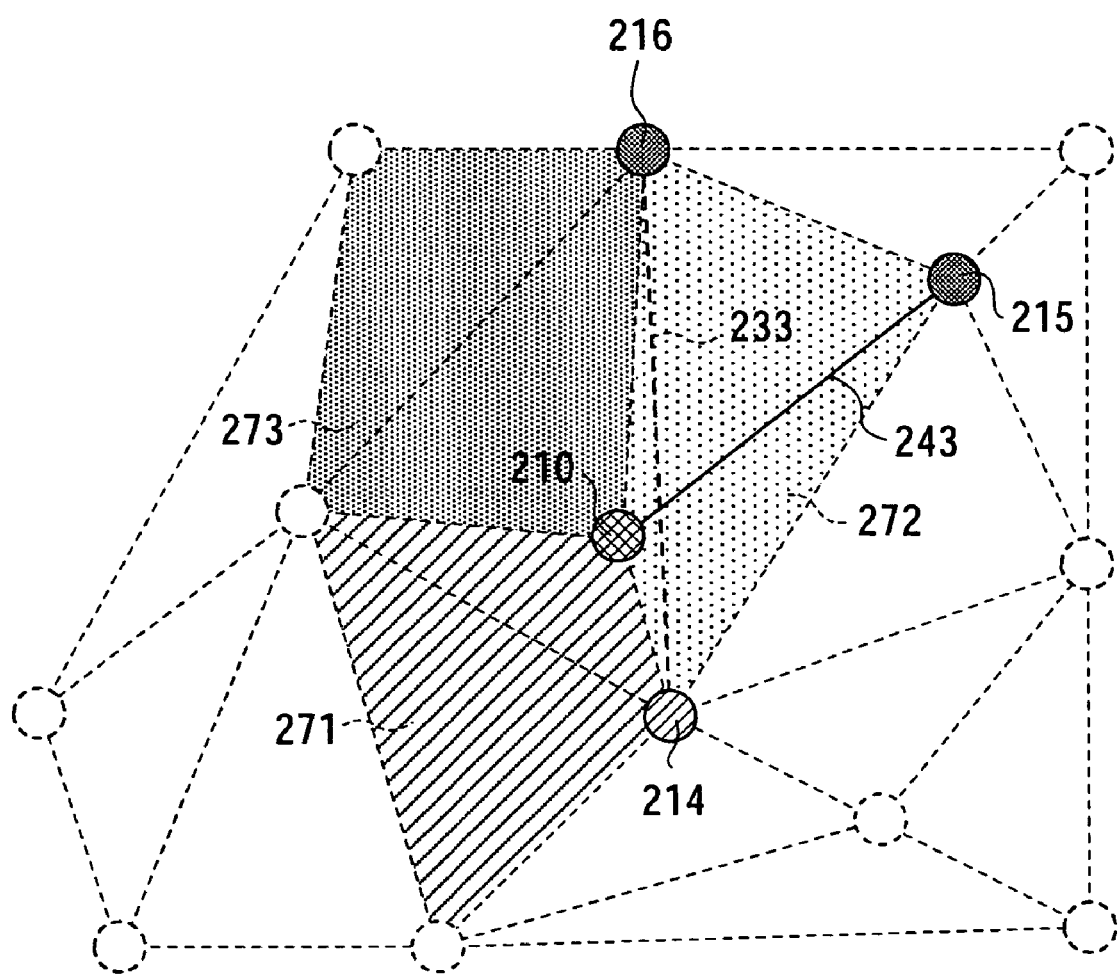
FIG. 17 shows how a network is reconfigured, i.e., how the connections among connection servers are changed, as a result of a new server entering the network.
Figure 18:
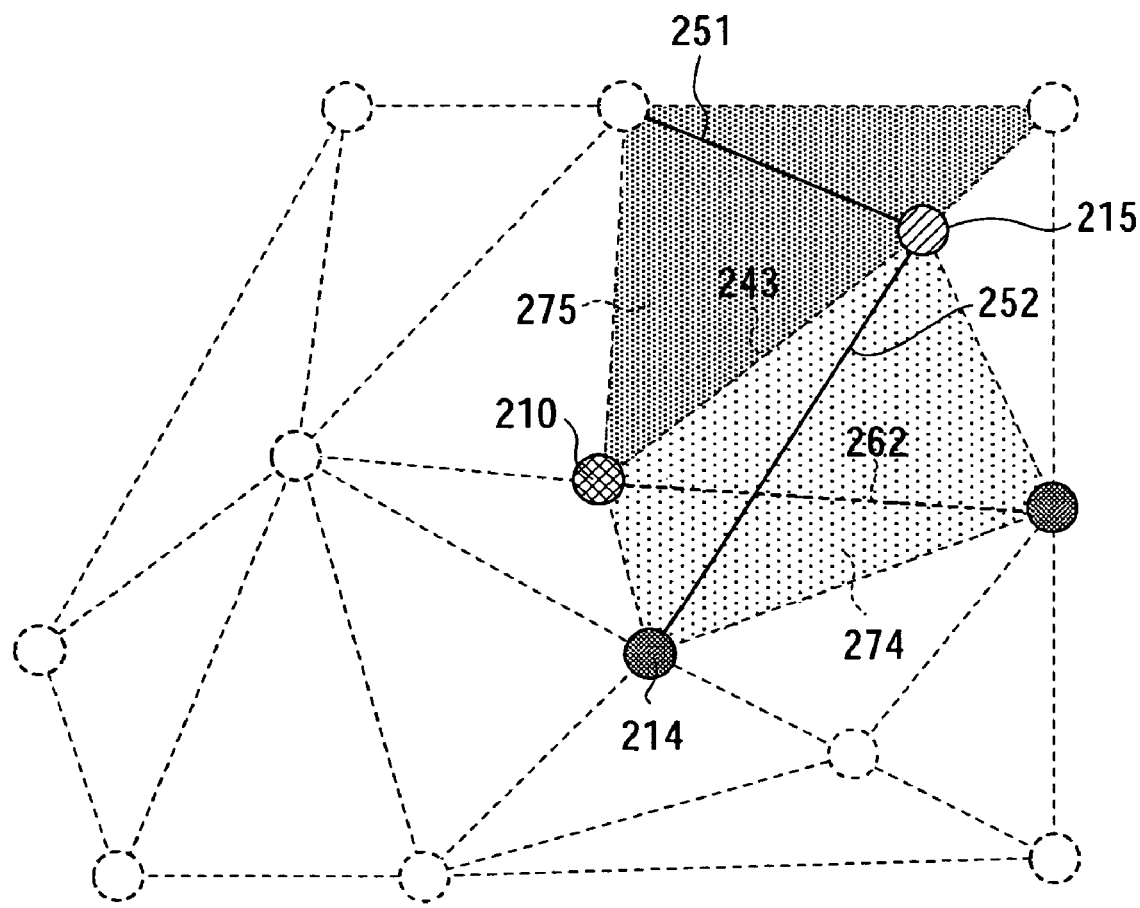
FIG. 18 shows how a network is reconfigured, i.e., how the connections among connection servers are changed, as a result of a new server entering the network.

FIGS. 16 to 18 show how the network is reconfigured, i.e., how the connections among connection servers are changed, as a result of the new server 210 entering the network.

Referring to FIG. 16, the present connection server requests the other connection servers 212 and 216 in the cell 270 to include the new server 210 as a neighboring server. The connection server 214 itself registers the connection server 210 as a new neighboring server in its neighboring list. In addition, the present connection server requests the new server 210 to include in its list the connection servers 212, 214, and 216 constituting the cell 270. Thereby, connections 221 to 223 are established.

Referring to FIG. 17, the lengths of the diagonal lines of the cells 271 to 273 that are affected by the establishment of the connections 221 to 223 are evaluated for change. In the cell 272, the existing diagonal line 233 is longer than the other diagonal line 243 in length, and therefore, the present connection server requests the connection server 216 to delete present connection server itself from the neighboring servers list. In addition, the present connection server deletes the connection server 216 from its neighboring servers list.

Thereafter, in order to establish a new connection, the present connection server requests the connection server 210 to register the connection server 215 in its neighboring servers list, and also requests the connection server 215 to register the connection server 210 in its neighboring servers list. Thus, the connection 233 is deleted and a new connection 243 is established.

The cells 271 and 273 also check their diagonal lines in the same manner. In the example shown in FIG. 17, the existing diagonal lines are used as is for the cells 271 and 273.

Thereafter, the affected cells sequentially check their diagonal lines as a result of one diagonal line being changed, as shown in FIG. 18. In the example shown in FIG. 18, the connection server 214 requests the connection server 215 to check whether its diagonal line should be changed as a result of the new connection 243 being established. The connection server 215 requested to check whether its diagonal line should be changed checks the diagonal lines of the cells 274 and 275 having the new connection 243 as a boundary in the same manner as described with reference to FIG. 17. In the example shown in FIG. 18, the length of a new diagonal line 262 is compared with the length of the existing diagonal line 252 in the cell 274. In the cell 274, the existing diagonal line 252 is shorter than the new diagonal line 262, and therefore the existing diagonal line 252 is used as is.

Thus, the above-described processing for checking whether the diagonal lines of a cell should be check and, if necessary, changed is repeated for all cells on the network affected by the new connection.

This series of processing is performed at anytime, when required, along with normal communication services for mobile terminals. For the processing above, in practice, a frequency band other than the frequency band for communication with portable terminals may be used, or information required for such processing may be distributed in packets. Alternatively, hardware dedicated to the processing described above may be used fully in parallel, or through time-sharing by means of one or more arithmetic units. A specific implementation is not described in this specification, because what is important is to dynamically reconfigure the network.

Figure 19:
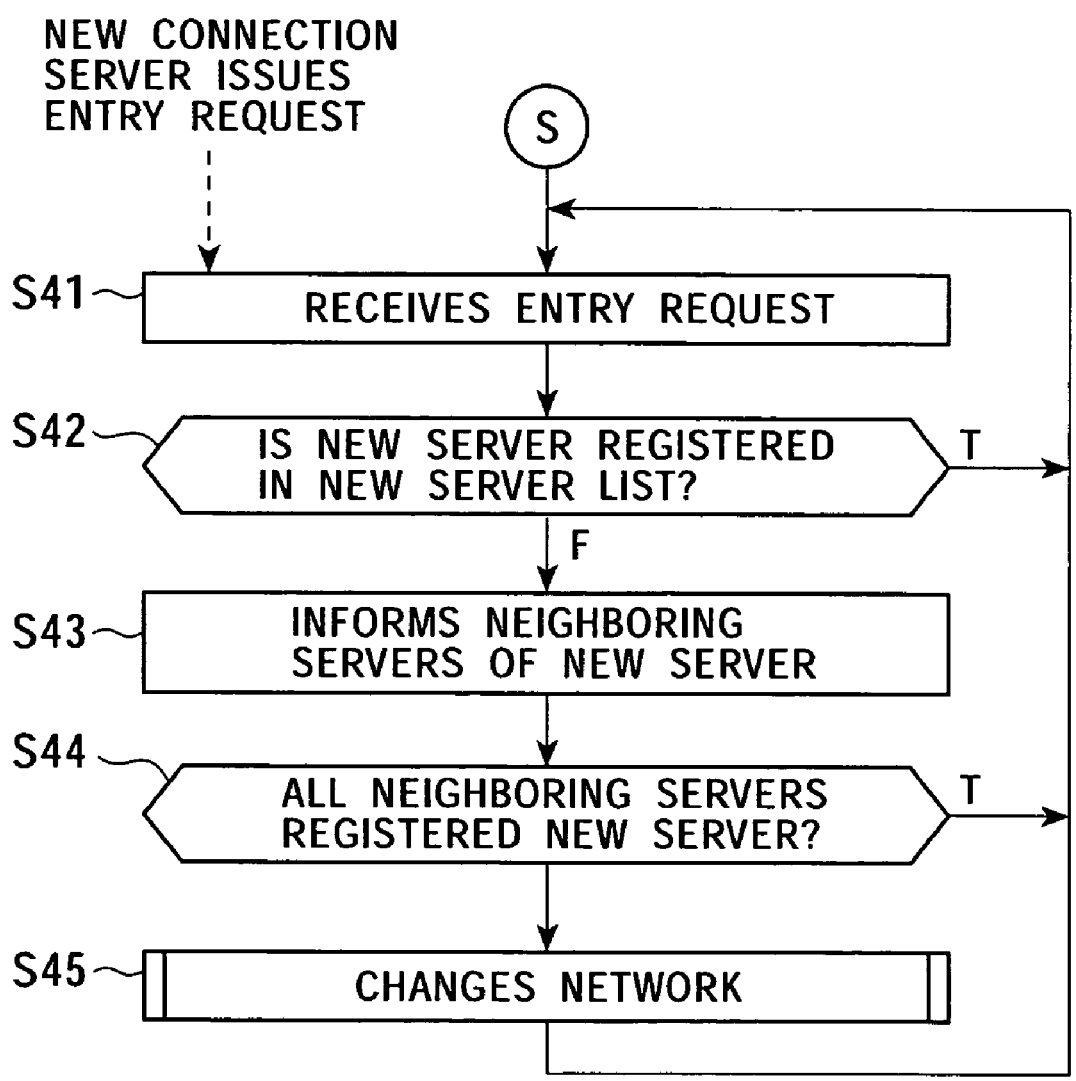
FIG. 19 is a flowchart showing the steps of establishing a new cell when the new server shown in FIGS. 13 to 15 is installed.

FIG. 19 is a flowchart showing the steps of establishing a new cell when the new server 210 shown in FIGS. 13 to 15 is installed.

When a connection server receives an entry request from a new connection server (step S41), the connection server checks whether the new connection server is registered in the new server list (step S42).

If the new connection server is not registered in the new server list, the connection server informs the other neighboring connection servers of the new connection server (step S43).

When receiving a response that these neighboring connection servers have registered the new connection server (step S44), the connection server changes the network configuration (step S45).

Figure 20:
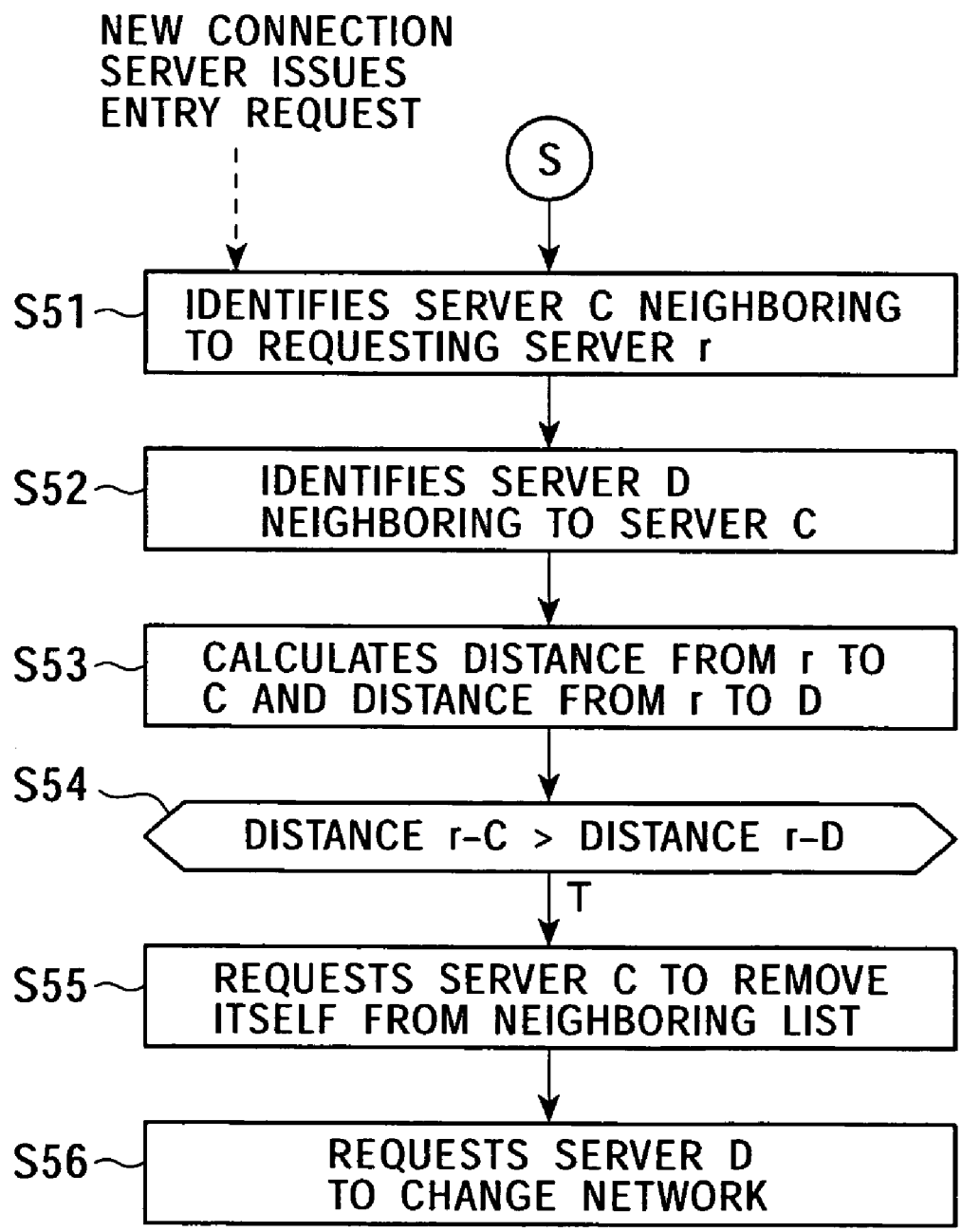
FIG. 20 is a flowchart showing the steps of changing a network configuration.

FIG. 20 is a flowchart showing the steps of changing the network configuration in step S45 in FIG. 19. These steps correspond to the illustrations in FIGS. 16 and 17.

First, a requesting server r identifies a server C neighboring thereto (step S51) and then identifies a server D neighboring to the neighboring server C (step S52).

Here, the requesting server r calculates the distance between the requesting server r and the neighboring server C as well as the distance between the server r and the neighboring server D (step S53) based on the location information acquired by a position measurement system such as a GPS.

In the steps described above, if the distance between the requesting server r and the neighboring server C is longer than the distance between the requesting server r and the neighboring server D (step S54), the requesting server r requests the neighboring server C to remove itself from the neighboring list (step S55), and then requests the neighboring server D to change the network (step S56).

Figure 21:
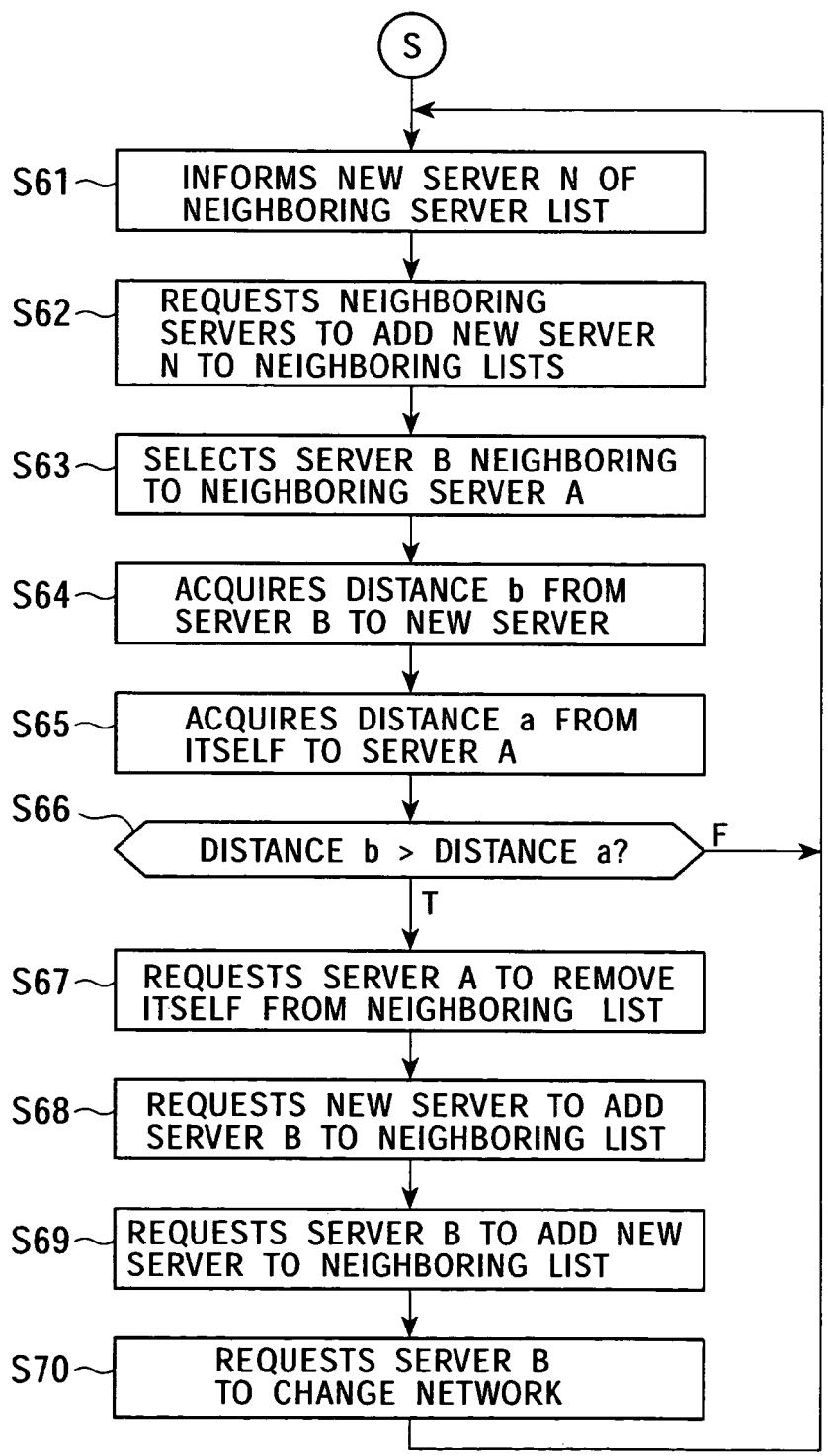
FIG. 21 is a flowchart showing the steps of changing the connections among neighboring connection servers according to the entry of a new connection server.
Figure 22:
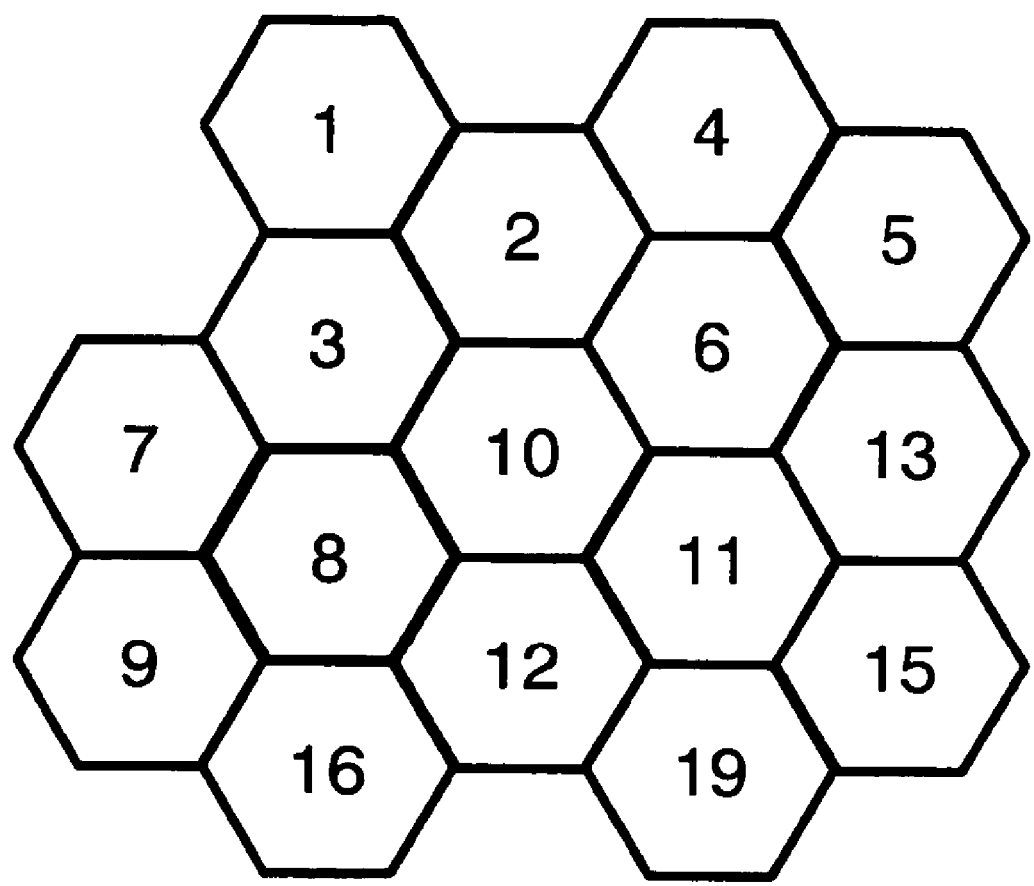
FIG. 22 schematically illustrates the layout of cells of a mobile radio communication system in which a service area is covered by using a plurality of cell stations.

FIG. 21 is a flowchart showing a change of the connections among the neighboring connection servers according to the entry of the new connection server. These steps correspond to the illustration in FIG. 18.

First, a server informs a new server N of a neighboring servers list (step S61).

Then, the server requests neighboring servers to add the new server N in the neighboring list of the neighboring servers (step S62).

Then, the server selects a server B neighboring to a neighboring server A (step S63) and acquires the distance b from this server B to the new server N (step S64). The server acquires the distance a between itself and the server A (step S65).

If the distance b is longer than the distance a (step S66), the server requests the server A to remove itself from the neighboring list (step S67).

Then, the server requests the new server N to add the server B to the neighboring list (step S68), and the server B to add the new server N to the neighboring list (step S69).

Finally, the server requests the server B to change the network (step S70).

The present invention has been described with reference to a particular embodiment. It is obvious, however, that various modifications are conceivable within the scope of the present invention. The present invention has been disclosed by way of an example, and therefore, the descriptions in this specification should not be subjected to limited interpretation. In order to appropriately interpret the essence of the present invention, the claims should be consulted.

What is claimed is:

1. A communication system comprising:
   a mobile terminal configured to transmit a current location and receive a streaming content;
   connection servers, each configured to acquire its own location and store the streaming content;
   control servers, each configured to
   receive the location of each connection server from each connection server,
   form a Voronoi diagram of geographic regions surrounding each connection server location, each geographic region containing only locations that are closer to a corresponding connection server location than to any other connection server location,
   identify a target geographic region in the Voronoi diagram that is likely to contain a future location of the mobile terminal at a future time based on the current location of the mobile terminal and a previous location of the mobile terminal received from the mobile terminal, and
   send selected content to the connection server in the target geographic region, the content selected based on the future time at which the target geographic region is likely to contain the future location of the mobile terminal.

2. The communication system according to claim 1, wherein connection servers are connected to one another and the control servers update connections among the connection servers based on the relative location of the connection servers.

3. The communication system according to claim 2, wherein the connection server is a newly installed server; and
   wherein the control server selects a connection server neighboring the new server, identifies at least one connection server affected by the new server, and changes connections among the connection servers depending on the distances among the connection server and the newly installed server.

4. The communication system according to claim 1, wherein a mobile terminal being in communication with a connection server switches to another connection server as the mobile terminal moves from one cell to another.

5. The communication system according to claim 1, wherein each control server adjusts a load share of the connection servers depending on the geographic location of each connection server.

6. The communication system according to claim 5, wherein each control server controls the load share of the connection servers based on estimated movements of the mobile terminals and a processing capability of each connection server.

* * * * *